United States Patent
Lucchesini et al.

(10) Patent No.: US 9,284,046 B2
(45) Date of Patent: Mar. 15, 2016

(54) AIRCRAFT WITH IMPROVED AERODYNAMIC PERFORMANCE

(75) Inventors: Massimo Lucchesini, Barasso (IT); Emanuele Merlo, Arona (IT)

(73) Assignee: ALENIA AERMACCHI SPA, Venegono Superiori (VA) (IT)

( * ) Notice: Subject to any disclaimer, the term of this patent is extended or adjusted under 35 U.S.C. 154(b) by 289 days.

(21) Appl. No.: 13/985,522

(22) PCT Filed: May 30, 2011

(86) PCT No.: PCT/IB2011/001230
§ 371 (c)(1),
(2), (4) Date: Nov. 21, 2013

(87) PCT Pub. No.: WO2012/110845
PCT Pub. Date: Aug. 23, 2012

(65) Prior Publication Data
US 2014/0070056 A1    Mar. 13, 2014

(30) Foreign Application Priority Data

Feb. 14, 2011   (IT) .............................. TO2011A0122

(51) Int. Cl.
*B64C 23/06*       (2006.01)
*B64C 1/00*        (2006.01)
(Continued)

(52) U.S. Cl.
CPC ............... *B64C 23/06* (2013.01); *B64C 1/0009* (2013.01); *B64C 1/1476* (2013.01); *B64D 7/00* (2013.01); *B64D 33/02* (2013.01); *Y02T 50/162* (2013.01)

(58) Field of Classification Search
CPC ...... B64C 23/00; B64C 23/06; B64C 1/0009; B64C 1/1476; B64D 7/00; B64D 33/02; Y02T 50/162

USPC ....................... 244/199.1–199.4, 88
See application file for complete search history.

(56) References Cited

U.S. PATENT DOCUMENTS

| 4,876,098 A | 10/1989 | Morgenthaler |
| 2005/0029402 A1 | 2/2005 | Lucchesini et al. |
| 2010/0028684 A1* | 2/2010 | Mariscal et al. ............... 428/413 |

FOREIGN PATENT DOCUMENTS

| DE | 36 41 289 | 6/1988 |
| DE | 3641286 A1 | 6/1988 |

(Continued)

OTHER PUBLICATIONS

Wikipedia: "Alenia Aermacchi M-346 Master." Http://en.wikipedia.org/w/index.php?title=Alenia_Aermacchi_M-346_Master&oldid+404014977 retrieved Sep. 14, 2011, 6 pages.*

(Continued)

*Primary Examiner* — Justin Benedik
(74) *Attorney, Agent, or Firm* — Merchant & Gould P.C.

(57) ABSTRACT

An aircraft (10) with improved aerodynamic performances is adapted to keep the directional stability and a very good aerodynamic behavior at medium-high incidence. The aircraft (10) includes a fuselage (12) to which shaped wings (18, 20) are associated, and a nose (52). The aircraft (10) also includes a vortex control device (72) of the extension of the leading edge of the wing at the root (LERX), shaped in order to symmetrize the bursting of the vortices generated by such LERX with a medium-high incidence. Said aircraft comprises removable equipment with at least one dissipation device of incident radar waves, on at least one hot portion of the aircraft.

8 Claims, 11 Drawing Sheets

(51) Int. Cl.
*B64C 1/14* (2006.01)
*B64D 7/00* (2006.01)
*B64D 33/02* (2006.01)

(56) References Cited

FOREIGN PATENT DOCUMENTS

RU 2144885 C1 1/2000
WO WO 88/04479 A1 6/1988

OTHER PUBLICATIONS

International Search Report for International application No. PCT/IB2011/001230 mailed Sep. 30, 2011 (3 pages).
Wikipepdia: "Alenia Aermacchi M-346 Master." http://en.wikipedia.org/w/index.php?title=Alenia_Aermacchi_M-346_Master&oldid+404014977 retrieved Sep. 14, 2011, 6 pages.
Peruzzi. "Alenia Aermacchi tests low radar cross-section kit for M-346." *Flightglobal*. http://www.flightglobal.com/articles/2011/01/13/351787/alenia-aermacchi-tests-low-radar-cross-section-kit-for.html retrieved on Sep. 14, 2011, 1 page.
Singapore Search Report for corresponding Singapore Patent Application No. 201306108-0, mailed Jun. 2, 2015.
Russian Office Action for corresponding Russian Patent Application No. 2013140287, mailed May 6, 2015.
Chinese Office Action for corresponding Chinese Patent Application No. 201180069581.9, mailed Jan. 6, 2015.
Ukraine Preliminary Opinion for corresponding Ukrainian Patent Application No. a2013 09879, mailed Jun. 2, 2015.
Luca Peruzzi: "Alenia Aermacchi tests low radar cross-section kit for M-346", FlighGlobal.com, Jan. 13, 2011, XP002658994, Retrieved from the Internet: https://www.flightglobal.com/news/articles/alenia-aermacchi-tests-low-radar-cross-section-kit-f-351787/.
"Alenia Aermacchi M-346 Master", Wikipedia, Dec. 24, 2010, XP002658993, Retrieved from the Internet: https://en.wikipedia.org/w/index.php?title=Alenia_Aermacchi_M-346_Master&oldid=404014977.

\* cited by examiner

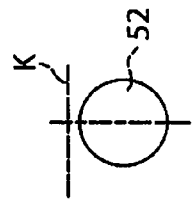
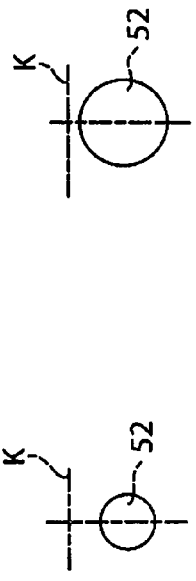
Fig. 8  Fig. 9  Fig. 10
Fig. 11 Fig. 12 Fig. 13
Fig. 14 Fig. 15 Fig. 16

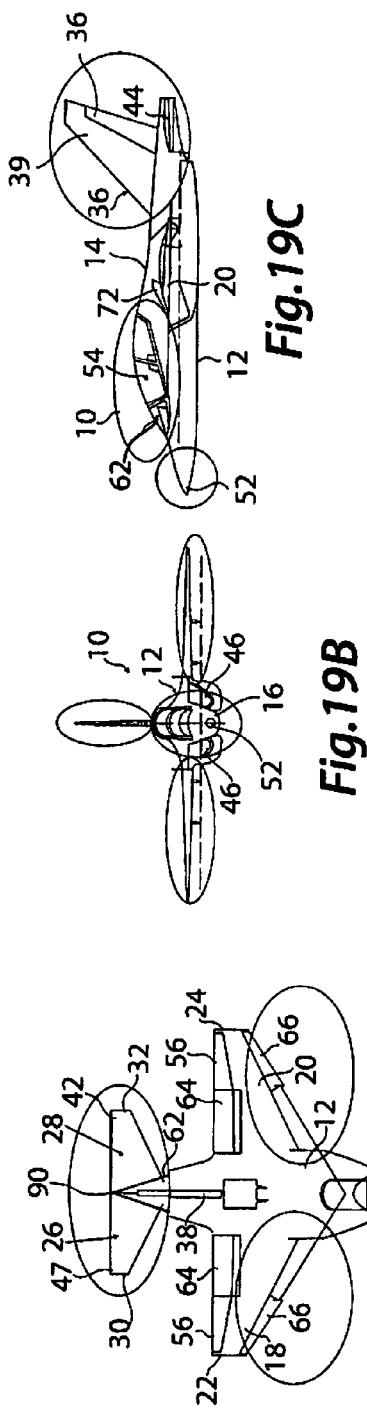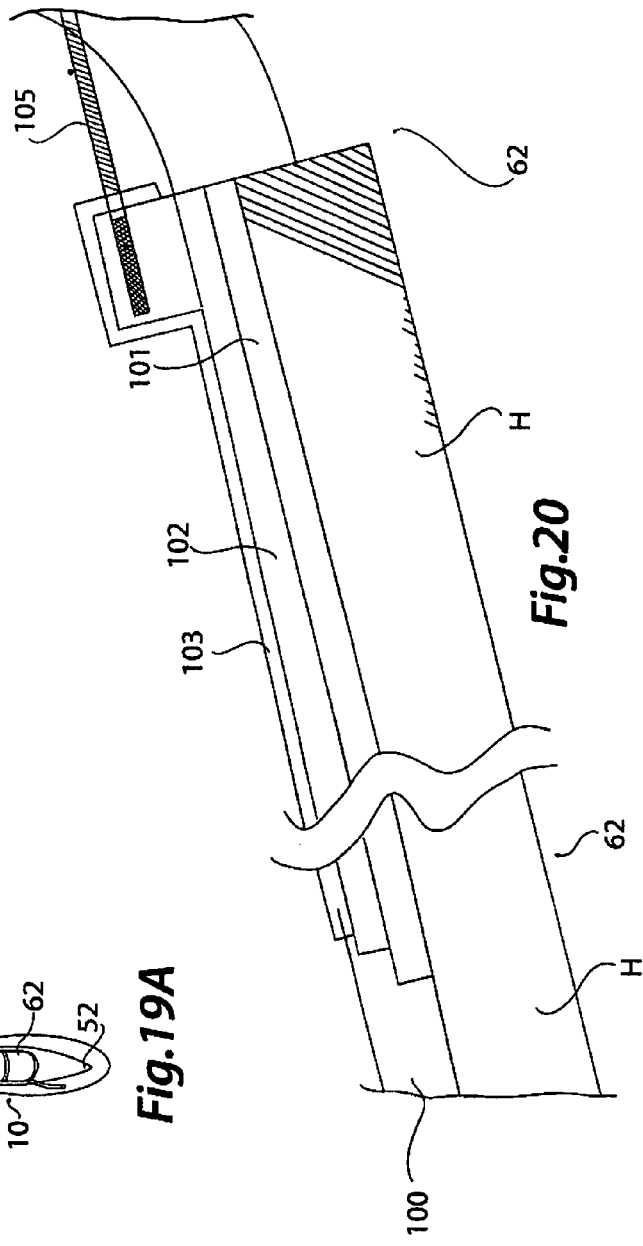

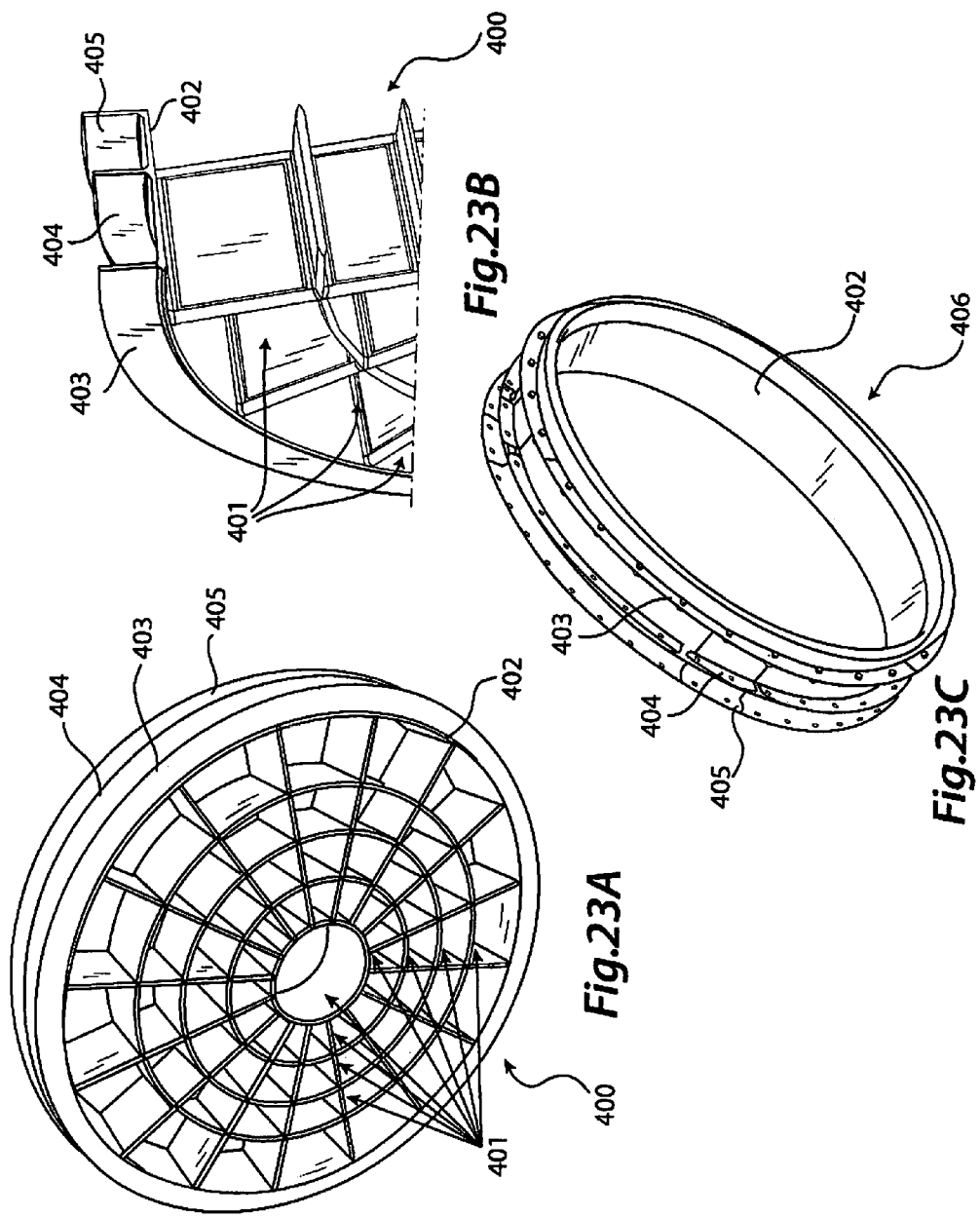

AIRCRAFT WITH IMPROVED AERODYNAMIC PERFORMANCE

This application is a National Stage Application of PCT/IB2011/001230, filed 30 May 2011, which claims benefit of Serial No. TO2011A000122, filed 14 Feb. 2011 in Italy and which applications are incorporated herein by reference. To the extent appropriate, a claim of priority is made to each of the above disclosed applications.

BACKGROUND

The present invention relates to a configuration of an aircraft having high aerodynamic performances and high performances with secondary operational capabilities.

Many kinds of aircraft must be easily piloted and must have particular dynamic characteristics in view of the missions to accomplish.

Such aircraft are often required to operate in airspace by flying at high incidence; this is in particular referred to the great incidence angle which the aircraft forms with respect to its own velocity vector, at each instant of time.

It is immediate to realize that, in such flight conditions, the aircraft must become extremely stable and easily controllable by the pilot, in order to keep a safe flight trim during the fighting phases.

Such stability is obtained by using particular automatic control apparatus, which permit the generation of forces and moments adapted to counterbalance undesired flight effects.

While the stability of the aircraft along the pitch axis can be suitably balanced through an optimized ratio between the position of the centre of gravity and the dimensions of the horizontal tail planes, the presence of lateral-directional instabilities (along the roll and yaw axis) with great incidence can be controllable with difficulty even adopting sophisticated automatic control apparatuses.

In this respect, it is therefore necessary to maximize the lateral-directional stability of the aircraft up to the great incidences, in order to increase the control possibility and the easy maneuvering so to prevent rapid and undesired deviation of the aircraft from a planned path.

Traditionally, and in particular, in recent days, attempts were made to obviate the instability drawbacks by acting on the aerodynamic profile of the fuselage and of other parts of the aircraft, but without reaching particularly valid results.

The use of aircraft on battlefields requires that they are not visible to the radar systems.

Aircraft of the known type are known with the term "stealth", which are provided with a very sophisticated structure suitably studied for the present purpose, that is to be invisible to the radar systems.

The structure of the stealth aircraft greatly reduces the reflection towards the point of observation of the radiated electromagnetic waves, so making the aircraft substantially invisible to the radar systems.

Furthermore, such aircraft are completely painted with absorbing paints, which absorb the incident electromagnetic waves, so making the aircraft substantially invisible to the radar systems.

Such solution is costly for the realization of the aircraft itself, and its aerodynamic configuration is less than favorable so making the behaviour of the aircraft insufficient during the flight at high incidence.

SUMMARY

Within the aforementioned needs, one purpose of the present invention is therefore to obviate the cited drawbacks and in particular, to propose a configuration of aircraft with improved aerodynamic performances, which permits to optimize the behaviour of the aircraft mainly in the case of a flight with high incidence.

Another purpose of the present invention is to indicate a configuration of aircraft with improved aerodynamic performances, which permits to reduce the "buffet" effects characteristic of the wings with low elongation with a thin profile and variable centerline.

Further purpose of the present invention is to realize a configuration of aircraft with high aerodynamic performances, which permits to successfully prevent the loss of lateral-directional stability and the negative effects produced by the engine jet adjacent to the wall of the fuselage and the horizontal tailplane, in terms of resistance, stability and longitudinal control.

Further purpose of the present invention is to realize a configuration of aircraft with improved aerodynamic performances, making possible the exit from the spin, in general by optimizing the behaviour of the aircraft with high incidence.

Further purpose of the present invention is to realize a configuration of aircraft with high aerodynamic performances, which permits the installation of at least one battle equipment, as for example for the reduction of the radar signature, removable and adapted to make substantially the aircraft invisible to the radar systems.

In an advantageous way, the aircraft which is the subject of the present invention is designed, in particular, as an aircraft with high performances with secondary operational capabilities.

The configuration form is twin-engine and it is characterized by the presence of a series of extremely particular design features.

The preferably two-sided (tandem) cabin with mutually connected flight commands is first of all placed side by side to a nose having a substantially circular and variable cross-section, with a small elongation, which is optimized for a flight with high incidence, in which a radar can be integrated for the operating version.

The shape and dimensional characteristics of the nose are optimized in order to reduce the vortex interference of the same upon the aerodynamic characteristics of the aircraft with medium-high incidence; the mentioned characteristics furthermore permit to reduce the directional asymmetries with high incidence, which are typical of the traditional noses having a circular or elliptical cross-section.

Furthermore the wing profile is so modified, with respect to the profiles currently provided, that it integrates a system of minimization of the "buffet" effects characteristic of the wings with a small elongation and a thin profile, having a variable centerline.

The aerodynamic project further provides for positioning a control device of the vortices of LEX (LEX="Leading Edge Extension"), suitably shaped in order to symmetrize the explosion of vortices generated by the LEX with a medium-high incidence, due to the fact that the symmetrical explosion of such vortices permits to keep the lateral-directional stability and the control of the aircraft with a medium-high incidence.

The training aircraft according to the invention has further an engine air intake adapted to guarantee the performances and the suitable fluid-dynamic interface with the engine; such project does not require the integration of a typical boundary layer on the upper side of an air intake integrated with a LEX.

The uncoupling of the horizontal and vertical tail plane permits to obtain a reduction of the aerodynamic resistance generated by the rear fuselage, to optimize the spin behaviour of the aircraft and improve the aerodynamic project of the same for the high incidence.

Finally, the removable equipment for the reduction of the radar signature of the aircraft is applicable in at least one warm portion of the aircraft, by keeping the aerodynamic characteristics of the aircraft (V).

BRIEF DESCRIPTION OF THE DRAWINGS

Further purposes and advantages of the present invention will be evident from the following description and the annexed drawings, given in a purely exemplary and non limitative way, in which:

FIG. 8 is a cross-sectional view, taken along the line VIII-VIII of FIG. 7;

FIG. 9 is a cross-sectional view, taken along the line IX-IX of FIG. 7;

FIG. 10 is a cross-sectional view, taken along the line X-X of FIG. 7;

FIG. 11 is a cross-sectional view, taken along the line XI-XI of FIG. 7;

FIG. 12 is a cross-sectional view, taken along the line XII-XII of FIG. 7;

FIG. 13 is a cross-sectional view, taken along the line XIII-XIII of FIG. 7;

FIG. 14 is a cross-sectional view, taken along the line XIV-XIV of FIG. 7;

FIG. 15 is a cross-sectional view, taken along the line XV-XV of FIG. 7;

FIG. 16 is a cross-sectional view, taken along the line XVI-XVI of FIG. 7;

FIGS. 19A, 19B and 19C show an aircraft, according to the present invention, in different projected views in which the hot portions are evidenced, which typically are the most significant and can be made invisible by the radar system through the reduction equipment of the radar signature;

FIG. 20 shows in cross-section a metallization made to the transparent surfaces of the aircraft, according to the present invention;

FIG. 22B showing a portion of the cover used for making the first ordinate of the fuselage of the aircraft invisible to the radar systems, according to the present invention in a front cross-sectional vision;

FIGS. 23A, 23B and 23C show the grid adapted to make the engine face of the aircraft invisible to the radar systems, according to the present invention; in particular, FIG. 23A shows the grid in a perspective vision, FIG. 23B shows a detail of the cross-section of a grid, FIG. 23C shows the substitution structure to be substituted to such grid once having been removed.

DETAILED DESCRIPTION

Figure 1:
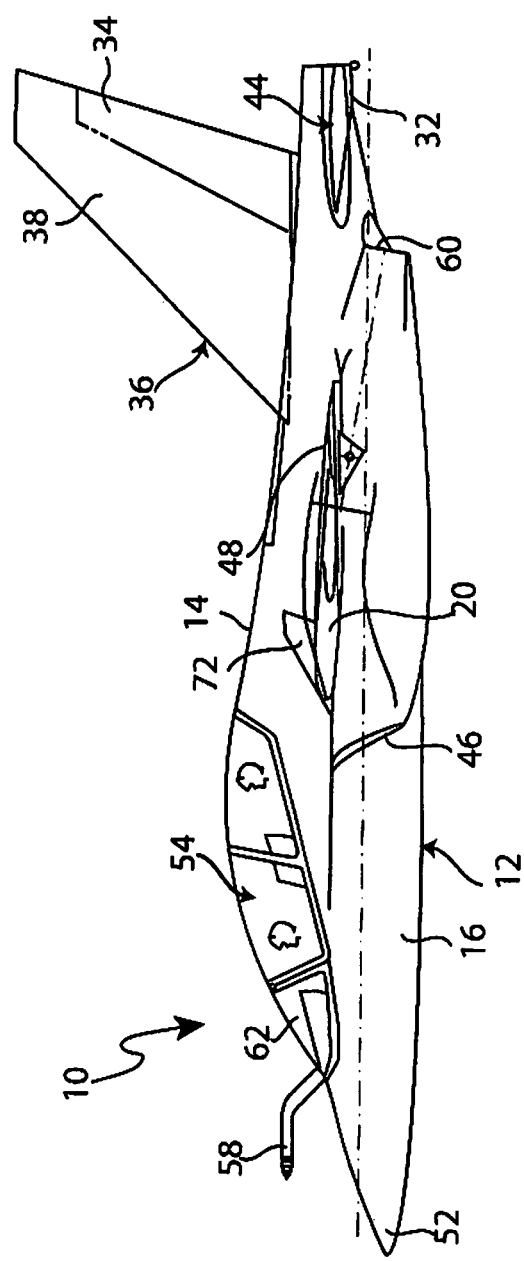
FIG. 1 is a side view of an aircraft, in particular a training aircraft, designed according to the present invention.

With reference to the cited figures, an aircraft is shown, in particular a training aircraft, having a configuration with improved aerodynamic performances, according to the present invention, generally indicated with the reference number 10.

Aircraft 10 comprises a fuselage 12, having an upper wall 14 and a lower wall 16, and two wings, one right wing 18 and one left wing 20 respectively, being connected with fuselage 12.

Right wing 18 has a wing end 22, whereas left wing 20 has end 24.

Aircraft 10 further comprises a directing rudder 34, mounted on tail drift 8 or vertical tail plane and a horizontal tail plane 44, having one right horizontal stabilizer 26 and one left horizontal stabilizer 28, with respective ends 30, 32.

In preferred but not limitative embodiments of the invention, as previously noted, the typical configuration shape is one twin-engine having two air intakes 46 for the inlet of corresponding turbo-jets 48, having respective outlet cones 60.

Finally, near nose 52, in which a radar can be integrated for the operative version of aircraft 10, a cockpit 54 is installed, preferably two-sided (tandem) with mutually connected flight commands, which is protected by a windshield 62 and furthermore a probe 58 can also be provided, for the operation of refueling aircraft 10 in flight.

Figure 2:
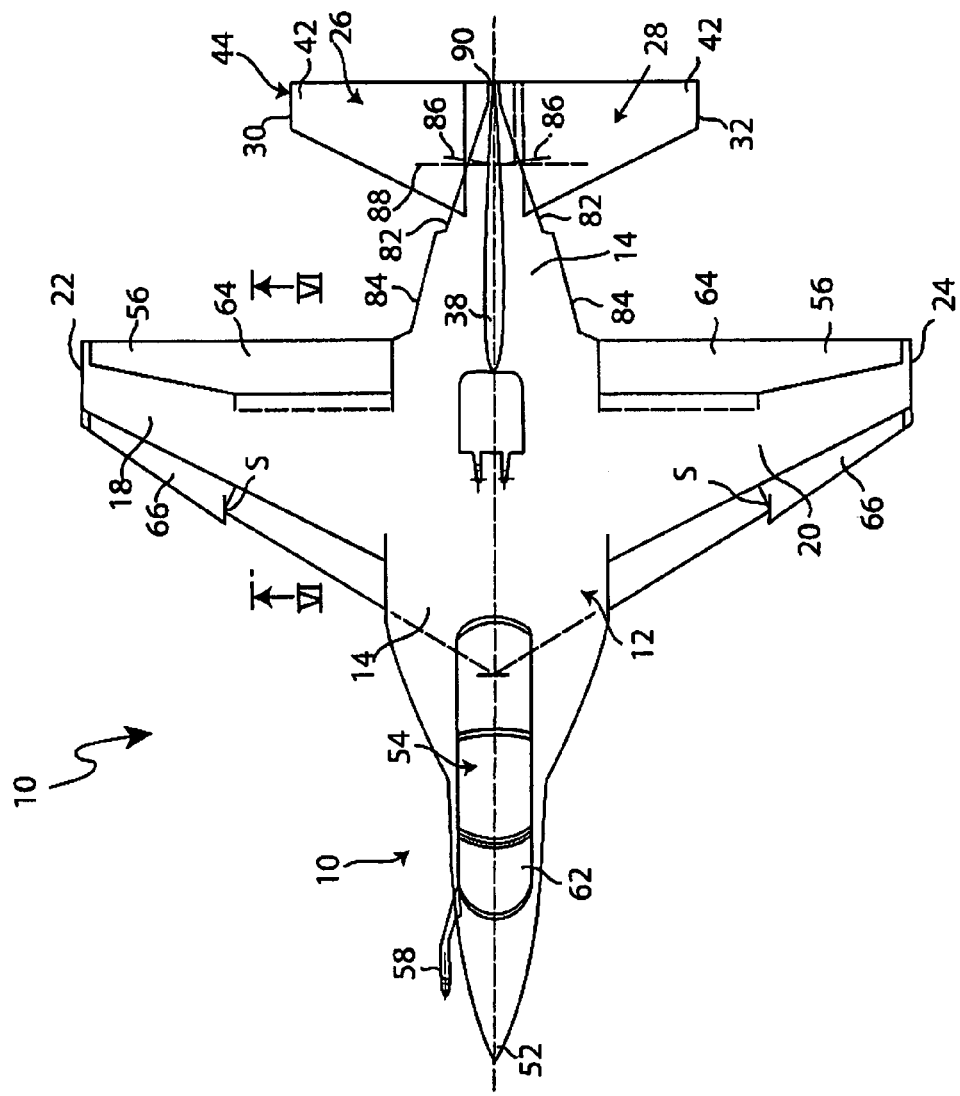
FIG. 2 is a top view of an aircraft, in particular a training aircraft, designed according to the present invention.
Figure 3:
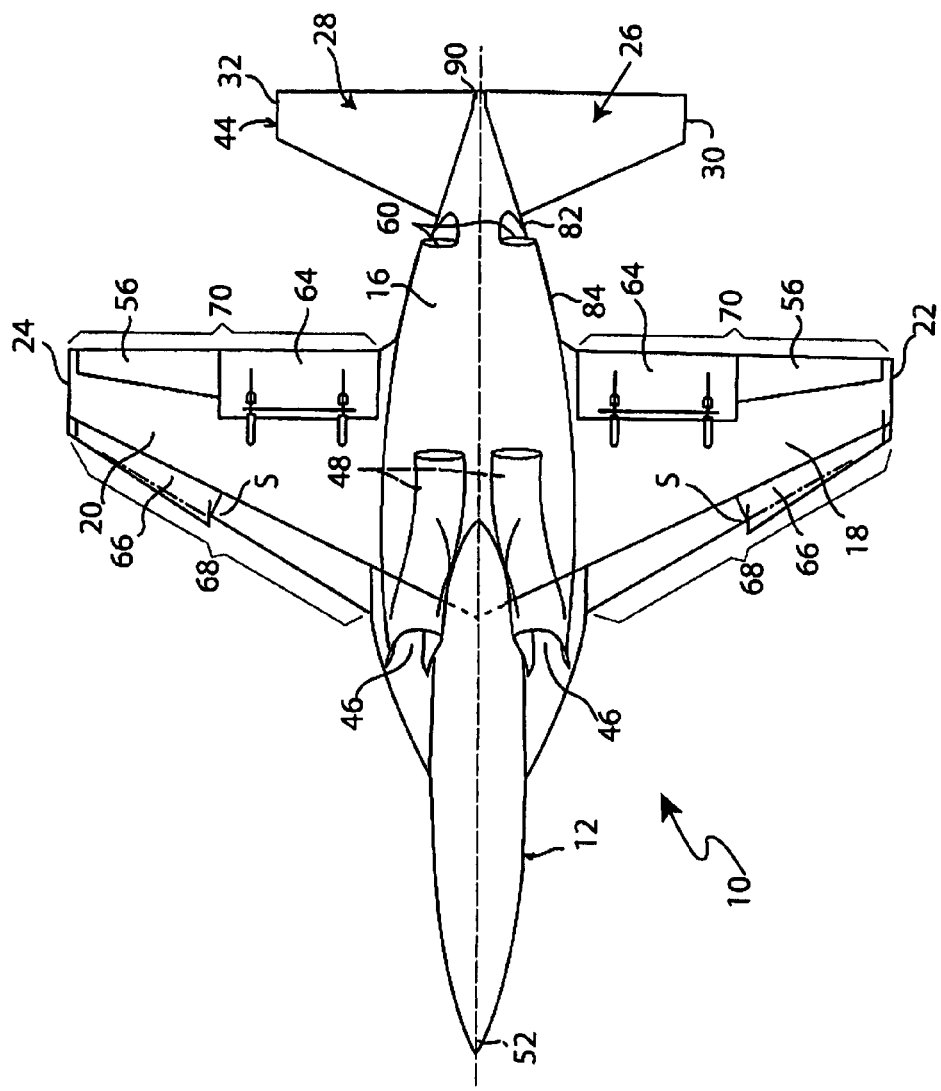
FIG. 3 is a bottom view of an aircraft, in particular a training aircraft, designed according to the present invention.
Figure 4:
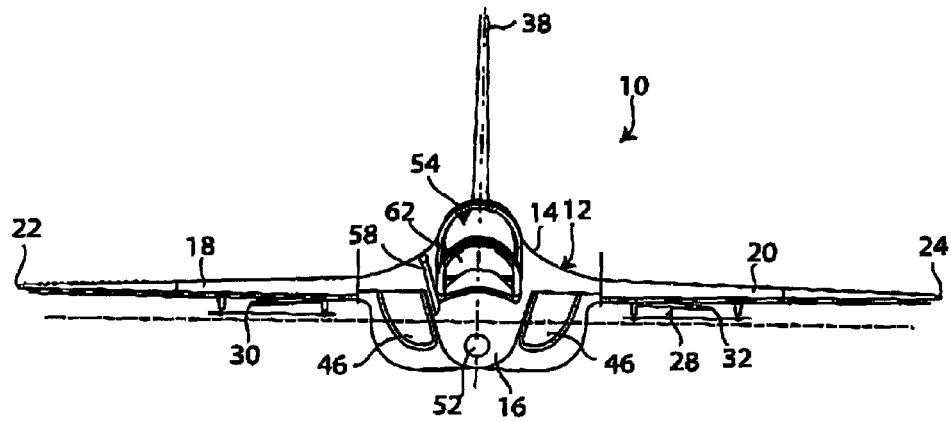
FIG. 4 is a front view of an aircraft, in particular a training aircraft, designed according to the invention.
Figure 5:
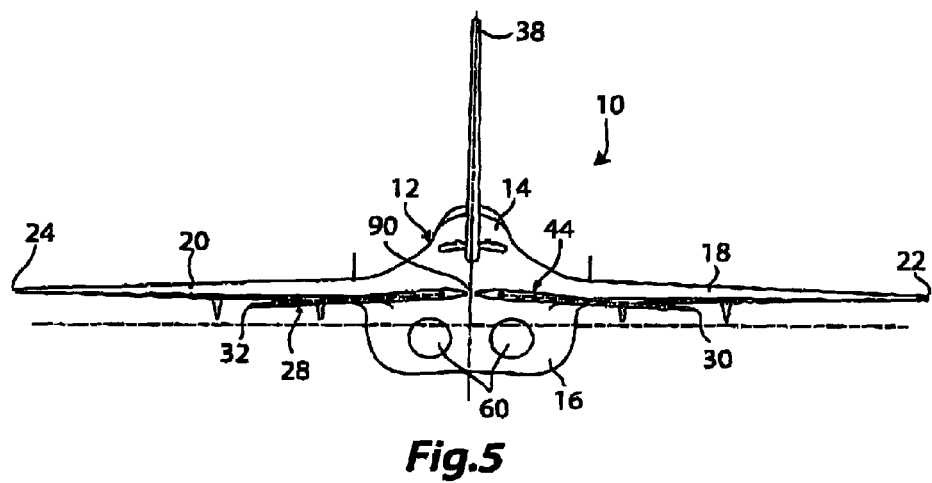
FIG. 5 is a rear view of an aircraft, in particular a training aircraft, designed according to the invention.

With particular reference to FIGS. 2 and 3, each wing 18, 20 of aircraft 10 has outer ailerons 56 and inner flaps for take-off and landing 64, with a double slot, which are provided at the rear profile or trailing edge 70 of each wing 18, 20, and further optimizing devices of the wing maneuvering profile or mobile leading edge (leading edge droops) 66, present at leading edge 68 and the profile of which is shaped according to a particular geometry, on the basis of the general aerodynamic considerations cited in the present description.

More particularly, the technical features of aircraft 10, adapted to obtain high aerodynamic performances and flight stability, according to the present invention, are the following.

First of all, the aerodynamic project is characterized by the presence of a control device (LVC="LEX Vortex Controller") of the vortices of the LEX ("Leading Edge Extension) with a medium-high incidence (reference number 72 of FIG. 1).

In fact, the presence of LEX, having the plan gothic shape equal to 6.4% of the gross wing surface (as in the case of the present invention), permits to generate a vortex lift with high incidence and the project of the LEX is further refined with the integration of a LVC ("LEX Vortex Controller") at the end of the same, in order to assure the symmetrical explosion of the vortices with high incidence with yaw attitudes, so preventing the consequent loss of lateral-directional stability.

The dimensions of control device 72 depend on those of the LEX facing it, and in any case, the greater the LEX, the higher the LVC; the tolerance can be defined in terms of the ratio between the surface of one LEX and the height of the corresponding LVC, according to which the design value of this ratio is 2.35 m and the tolerance field to apply varies between +100% and −50% with respect to the design value.

The shape of nose 52 of aircraft 10 and its dimensional features are further optimized in order to reduce the vortex interference of the same on the aerodynamic features of aircraft 10 with a medium-high incidence; the cited features further permit to reduce the directional asymmetries with high incidence, which are typical of the noses having a traditional circular or elliptical cross-section.

Nose 52 ("forebody") of aircraft 10 according to the invention has a series of cross-sections having a different geometry starting from tip 74 up to a connecting corner with the apex of the LEX.

An exemplary and preferred, but not limitative, embodiment of the geometric shape and of the successive cross-sections having a different geometry, between tip 74 and a reference cross-section taken at an altitude 76 (substantially positioned at the beginning of the cockpit 54), is illustrated in sequence in FIGS. 8-17, from which it can be derived that from a substantially circular cross-section with a low extension (FIGS. 8-11) one goes to a cross-section having an oval geometrical or dome shape (FIGS. 12-17).

Figure 17:
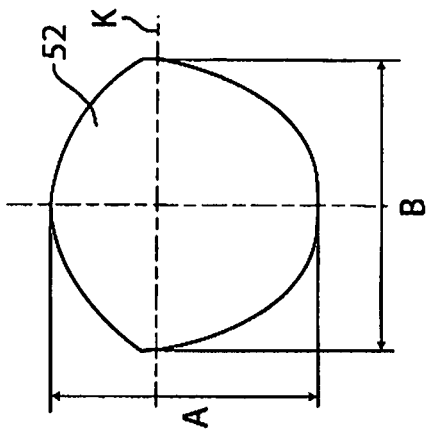
FIG. 17 is a cross-sectional view, taken along the line XVII-XVII of FIG. 7.
Figure 7:
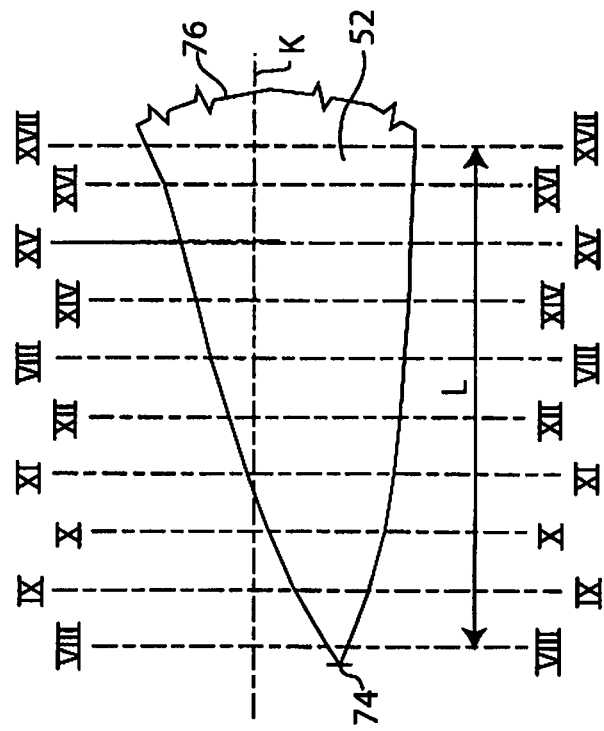
FIG. 7 is a partial and enlarged view of a detail of the configuration of aircraft designed according to the present invention.

From the mentioned figures also the offset position of nose 52 can be seen, from tip 74 up to the reference cross-section illustrated in FIG. 17, with respect to longitudinal axis K.

In particular, according to a preferred embodiment of the invention, the ratio between the length of nose 52, taken from tip 74 up to the cross-section made along the line XVII-XVII (reference L), and the average between the lengths A and B of the two half-axes of the cross-section of the same (cross-section illustrated in FIG. 17) has a value of 1.873, with a tolerance of ±10%.

The special construction and its reflection in terms of the aerodynamic conditions in flight just derives from the combination of the parameter mentioned before (more or less the eventual tolerance) with the evolution of the cross-sections of nose 52, from the apex or tip 74 of aircraft 10 up to the reference cross-section taken along the line XVII-XVII.

Figure 18:
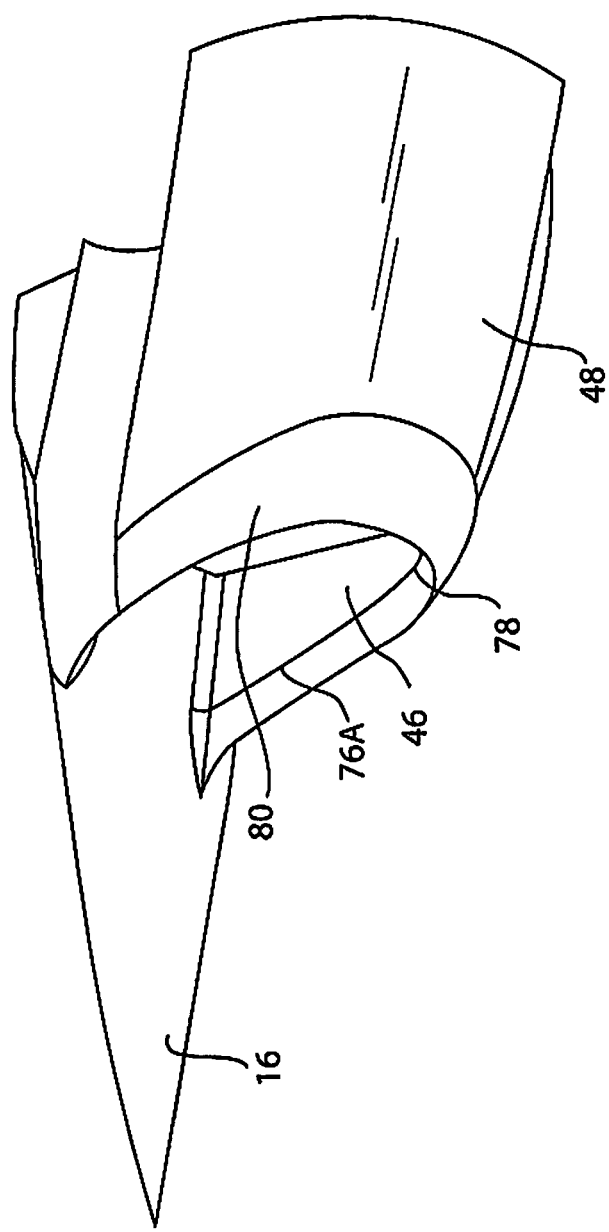
FIG. 18 is a perspective and enlarged view of a detail of the configuration of aircraft designed according to the present invention.

In FIG. 18 an engine air intake is also shown in detail, generally indicated with 46, which contributes to guarantee the performances of aircraft 10, mainly regarding the adequate fluid-dynamic interface with the relative turbojet engine.

Air intake 46 has a radius at the evolutive leading edge, optimized in order to reduce the distortion to engine face 47 on the inner side, due to the high incidence on the lower portion and for reducing the bleed resistance on the outer side.

In particular, the average radius at the leading edge of inner lip 76A has a value of 7 mm, whereas the average radius of lower lip 78 is 17.5 mm and that of outer lip 80 is 14 mm, so that the capture area of the air intake is approximately 0.322 $m^2$, the throat area of the air intake is approximately 0.257 $m^2$ and the inlet area at the engine is approximately 0.273 $m^2$ (it must be remembered that such dimensions are referred to an air intake).

Air intake 46 is characterized by the absence of a typical spacer of the boundary layer ("diverter") on the upper side of each intake integrated with one LEX, thanks to the particular relationship between the length of the LEX and its shape itself; in fact, the LEX acts as a flow straightening shield with a high incidence.

The air intake system can further provide for the presence of two additional intakes (non illustrated in the figures), positioned on the back of the connection between wing 18, 20 and fuselage 12, which open when the pressure in the connection is lower than the pressure on the back of the connection wing-fuselage, thanks to preloaded springs integrated in the hinge of the same additional intakes.

The function of such air intakes is to reduce, when opening, the local incidences on the lips of the main air intake 46 with a high incidence, so reducing the quantity of air passing through the cited main air intake 46.

One of the particular features of aircraft 10, which guarantee its high performances with respect to its flight stability and aerodynamic structure, is surely made by the uncoupling of horizontal 44 and vertical tail plane 38, which permits to reduce the aerodynamic resistance generated by the rear fuselage, optimizing the spin behaviour of aircraft 10 and improve the entire aerodynamic project of the same for its high incidence.

The vertical empennage with a trapezoidal shape comprises a rudder 34 and is coupled with the wing, in the sense that the leading edge of the same, generally indicated with 36 in FIG. 1, permeates trailing edges 70 of each wing 18, 20, in order to make it possible the exit from the spin and for optimizing in general the behavior of vehicle 10 with a high incidence.

The horizontal empennage, also characterized by a trapezoidal shape, is actuated by two independent actuators, which permit the symmetrical and asymmetrical deflection of the same; such empennage has finally a hinge axis, indicated with 86 in FIG. 2, which is inclined rightwards and leftwards about 7.5°, with respect to a transversal axis 88, in order to optimize the inertia and hinge moments.

The uncoupling between the horizontal and vertical tail plane can further be characterized by defining a tolerance on a reference parameter, defined as the ratio between altitude C, shown in FIG. 1 and which can be defined as the distance between the apex at the root of the drift and the apex at the root of horizontal tail plane 44, and the tail arm, being of 4181 mm; it follows that the reference value cited before is 1932 mm/4181 mm=0.462, with an applicable tolerance of 10%.

Even the wing profile is modified and optimized, with respect to the training aircraft of the traditional kind, in order to reduce the "buffet" effect, by considering the known features of a wing having a low elongation with a thin profile and variable centerline near the saw tooth.

Figure 6:
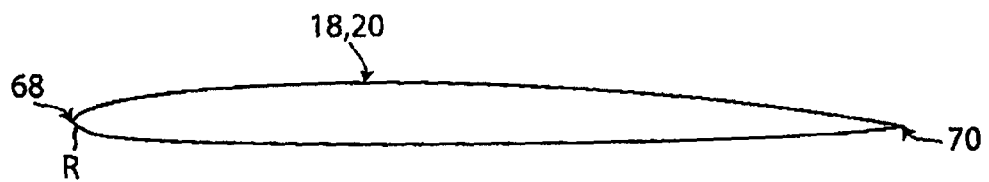
FIG. 6 is a cross-sectional view, taken along line VI-VI of FIG. 2.

According to the invention, on the contrary, a wing is used (references 18 and 20) having a trapezoidal shape, with a medium elongation (AR=4), characterized by the presence of a saw tooth (indicated with S in FIG. 2) being 67.5% of the gross wing aperture; the modification with respect to the traditional wings relates first of all to the radius of the leading edge, indicated with R in FIG. 6, the shape of which varies from the circular one (known art) to the triangular one, in order to optimize the position of the stagnation point, in the presence of leading edge 68 and of "Leading Edge Droops" 66 deflected at medium incidences.

As can be clearly seen from FIG. 6, which shows an enlarged cross-section along line VI-VI of FIG. 2, each wing 18, 20 is provided with a profile with a variable curvature, both at leading edge 66 ("Leading Edge Droop") and at trailing edge 70, by ailerons 56; these are programmed only in the transonic field, in order to provide for a reduction of the curvature which alleviates the compressibility effects.

In quantitative terms, the design value of the cord percentage extension at the leading edge is 0.36%, with a tolerance from +0.5% and −0.2%, with respect to the nominal value, whereas the design value of the gross percentage wing aperture at the modification of the profile, with respect to the traditional solutions, is 8.2%, with a tolerance from +10% and −5%, with respect to the nominal value.

Further features of aircraft 10 are represented in fuselage 12, which in its rear portion 16, provides for the integration of the engine outlets and the presence of a small stern, indicated with 90 in FIG. 3, which supports the tail planes.

Also the region corresponding to the engine outlets is optimized in order to reduce the negative effects, in terms of resistance and stability/longitudinal control, produced by the engine jet adjacent to fuselage wall 12 and horizontal empennage 44.

Vehicle 10 is further made of a tricycle cart, comprising one front and two main carts, the front cart of which has a stem, with four closing doors of the space, and with a feedback towards the flow direction.

The main cart retracts in an opposite direction with respect to the flow direction and the feedback system is optimized in order to permit to install outer ventral loads into the fuselage.

Aircraft 10 according to the present invention integrates an automatic flight control system ("Fly By Wire"), of the digital quadruplex kind, which permits to optimize the performances and the flight qualities; the system then permits to improve the flight safety through the automatic limitation of the flight regimes, which could be non comfortable for the pilot or could cause the loss of control ("Carefree Handling").

The aircraft according to the present invention is provided with an equipment for the reduction of the radar signature of an aircraft, in at least one hot portion "H" of the aircraft itself, which is easily detectable by the radar systems. Such equipment comprises at least one device for dissipating incident radar waves, which can be applied and subsequently removed, in function of the needs, always maintaining the aerodynamic features of the aircraft.

For the purposes of the present invention, a hot "H" portion of the aircraft is defined as any of the portions normally detectable by a radar system, like for example: a cockpit 54, comprising transparent portion (canopy and windshield) 62; one first ordinate of fuselage 12, with which nose 52 is connected, to which the radar antenna of the aircraft is bound, visible from the radar through the nose made of radome transparent to the radiation itself; a plurality of leading edges (36, 66, 68) of the components like for example wings (18, 20), engine air intakes 46, fog tails (38, 44) and at least one engine face 47.

Such equipment provides for at least one device, with a particular or respective technical solution, for each hot portion of the aircraft, in order to reduce the radar signature.

For reducing the radar signature coming from the hot portions "H" of the aircraft like a cockpit 54, comprising transparent portion 62, the equipment comprises at least one metallization 100, which is made on transparent portion 62.

Such metallization 100 is adapted to restore an electrical continuity of the aircraft, so reducing the generation of diffractions of the incident wave, generated within the cockpit 54 covered by windshield and potentially receivable by the radar system; furthermore, it assures reflections outside the coverage of the radar system.

Metallization 100 is realized through the application of a plurality of coating layers, preferably three layers.

In the embodiment shown in FIG. 2 such metallization 100 comprises at least one first layer or base 101, which is able to prepare the windshield which must receive metallization 100.

The deposit of such first layer 101 is followed by at least a second layer 102, preferably through the deposit of material having a high degree of electrical conductivity, like for example gold or equivalent materials with high capacity of being mold on the surface. Such second layer 102, which in fact represents the conductive metalizing layer, is applied upon first layer 101 through atomization methods of the material.

For the protection of metallization 100 at least one protective coating 103 is deposed, adapted to minimize the risks of damages of metallization 100, due to accidental shocks or atmospheric agents.

In addition to the plurality of layers cited above, metallization 100 comprises a plurality of electrical devices adapted to guarantee the electrical connection of metallization 100 to the structure of the aircraft.

In the embodiment illustrated in FIG. 20 such electrical device comprises at least one junction device 105, preferably realized through a conductive sheet, for example of silver, being in electrical contact with second layer 102.

Such junction device 105 is able to connect the layers comprised in metallization 100 with the structure of the aircraft.

Such metallization 100 can be realized together with the realization of the transparent portions of the cockpit, which can be completely substituted.

Once having finished the use of the equipment on the aircraft it is sufficient to substitute windscreen 62 of the cockpit with transparent portions in which metallization 100 is absent.

For reducing the radar signature coming from the hot "H" portions of the aircraft, such for example at least one leading edge (36, 66, 68, 70) of the components like wings (18, 20), the equipment comprises at least one cover portion 200, positioned on the front edge of such components of the aircraft, by maintaining the aerodynamic profile of the component itself.

Figure 21B:
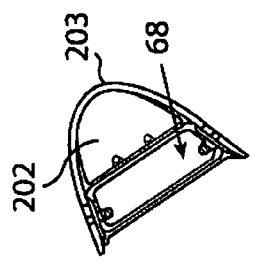
FIGS. 21A and 21B show the cover portion adapted to make the attaching edges of an aircraft invisible to the radar systems, according to the present invention, FIG. 21A respectively showing a cross-section in a perspective vision, FIG. 21B showing a lateral cross-section of the cover portion.
Figure 21A:
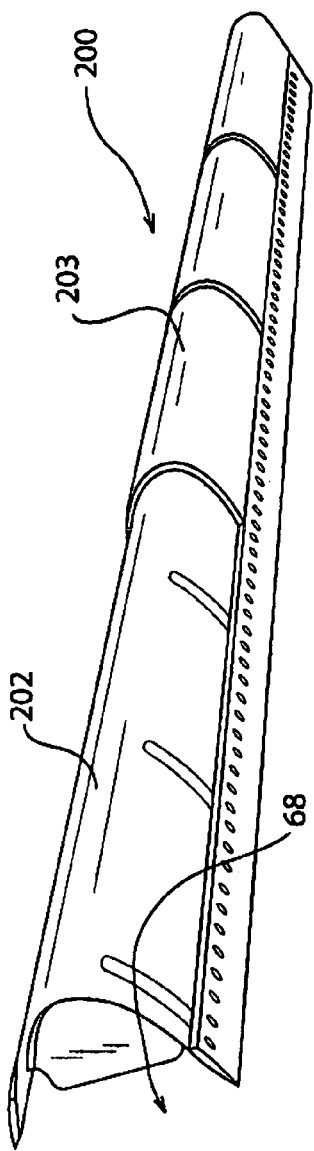

In the embodiment illustrated in FIGS. 21A and 21B such cover portion 200 comprises a first support structure 202 made of a preferably metal material, fixed to the structure of the component of the aircraft through fastening means, like screws or bolts.

Upon such first structure 202 a second radar-absorbing structure 203 is bound, adapted to absorb the incident electromagnetic waves so greatly attenuating the eventually reflected and/or refracted waves.

Once having terminated the use of such cover portion 200 it is unhooked from the structure of the aircraft itself and possibly substituted with a cover portion which however keeps its aerodynamic profile through a suitable shaping of the structure 202, upon which the second radar-absorbing coverage 203 is absent.

Such solution permits to keep the aerodynamic profile required for such leading edges, (36, 66, 68, 70), so reducing the costs and the complexity of installation.

For reducing the radar signature coming from the hot "H" portion of the aircraft, like the first ordinate of fuselage 12, at nose 52 the equipment comprises at least one sheet of adhesive metal material 301, for example of aluminum, which covers the first ordinate of fuselage 12 of the aircraft and at least one layer of absorbent material 302, fixed to such sheets of metal material 301.

Figure 22:
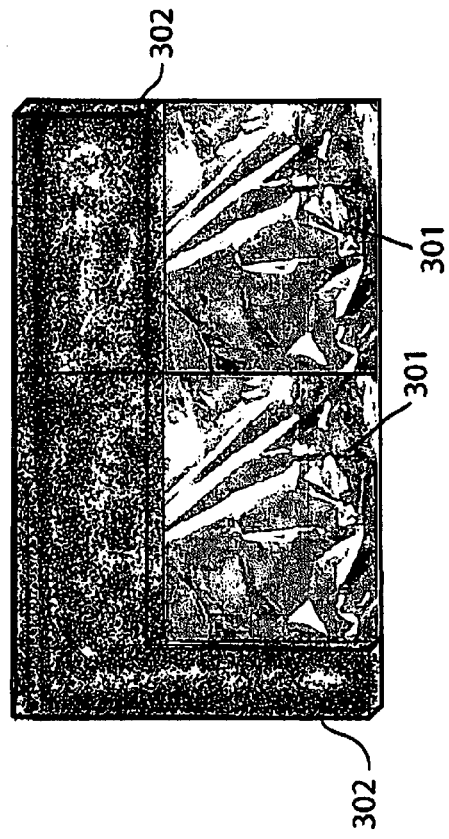
FIGS. 22A and 22B show the equipment for the first ordinate of the fuselage, FIG. 22A respectively showing the position of the equipment.
Figure 22A:
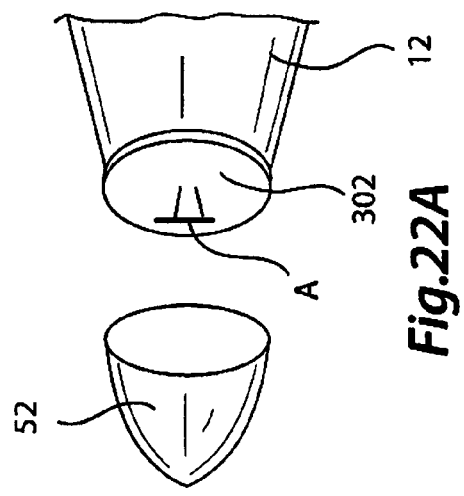

As shown in FIG. 22A the equipment is positioned between the first ordinate of fuselage 12 and radar antenna "A" which is coated by radome nose 52.

From a front vision, the shape of the sheets of metal material 301, and of absorbing material 302, are such to correspond to the shape of the first ordinate of fuselage 12 of the aircraft, with the features cited before.

As shown in FIG. 22B the absorbent material 302 is fixed for example by means of glue, to the sheets of metal material 301.

Absorbing material 302 used is for example a sponge layer soaked with ferrite powder, graphite etc., adapted to absorb the incident electromagnetic waves so greatly attenuating the reflected wave.

Once having terminated the function of the equipment for reducing the signature of the first ordinate of fuselage 12 of the aircraft, this is directly done by removing the sheets of metal material 301, to which layers 302 are fixed, so restoring the first ordinate of fuselage 12 back to the original state.

Such solution permits to reduce the costs and the weight of the equipment to be fastened to the aircraft, in addition to reducing the complexity for the fastening.

For reducing the radar signature coming from the hot portions of the aircraft, like at least one engine face 47, the equipment comprises at least one grid 400 adapted to permit the entry of an air flow towards the engine and reduce the visibility of engine face 47 of the aircraft by the radar system.

In the embodiment shown in FIGS. 23A and 23B grid 400 comprises an internal structure in which a plurality of apertures 401 are realized, having such dimensions to be like a plane surface for the lowest frequencies of the frequency spectrum, commonly used in the radar recognition systems operating at a low frequency, like for example Jet Engine Modulation, so avoiding the generation of diffracted waves which can be recognized by the radar system itself.

The internal surface of such apertures 401 is coated with a radar-absorbing material of a small thickness adapted to absorb the electromagnetic waves at higher frequencies, like for example in a X-band around 10 GHz.

The combination of the dimensions of apertures 401 and of the absorbing material, permits to make such component of the aircraft detectable with difficulty by the radar systems.

Preferably, such grid 400 has a circular shape similar to the cross-section of the structure of the engine compartment.

In the embodiment shown in FIGS. 23A, 23B grid 400 comprises a support structure 402, comprising a plurality of rings, adapted to fix such grid 400 to the aircraft through fastening means, like for example screws or bolts.

In the detail of FIG. 23B, support structure 402 comprises a first ring 403, which will be structurally bound to the duct of air intake 46 of the engine, a second ring 404, which will be bound to a fireproof bulkhead comprised in the engine compartment and a third ring 405, adapted to block the gasket interfaced with the engine.

Once having terminated the time in which the use of such grid 400 is necessary, it can be extracted from the structure of the engine compartment, and possibly it can be substituted, in order to keep the continuity of the duct, with a substituting structure 406, which essentially has the outer shape of the support structure and in which the inner structure of grid 400 itself is absent.

The equipment with which the aircraft is provided, according to the present invention, permits to obtain cost advantages both in the phase of realization and in the phase of maintenance, as it is only used when such application is necessary, so reducing the wear of such equipment.

The equipment only acts on the most important hot regions so avoiding to waste resources in order to make portions of the aircraft detectable with difficulty by the radar systems, which are still detectable with difficulty themselves, so greatly reducing the costs of the equipment itself.

The choice of only intervening on the centers which can be more greatly detectable is an optimization point between the cost of the operations and the effectiveness of the obtainable benefits.

Such equipment preferably is applied to all hot portions of the aircraft, cited according to the present invention, but in some cases it is possible to apply the equipment just on some of such "H" portions, by keeping other ones in their initial configuration.

From the description made the features are clear of the configuration of an aircraft with improved aerodynamic performances, which is the subject of the present invention, and also clear are its advantages.

It is finally clear that numerous other variations can be made to the structure of aircraft in question, without for this reason abandon the novelty principles inherent in the inventive idea, and it is also clear that, in the practical implementation of the invention, the materials, the shapes and the dimensions of the details shown can be of any kind according to the needs and the same can be substituted with other technically equivalent ones.

The invention claimed is:

1. An aircraft with improved aerodynamic performances, for maintaining direction stability and optimal aerodynamic behaviour with a medium-high incidence; said aircraft comprising a fuselage to which wings are associated, at least one air intake and a nose with a tapered section, and at least one engine; wherein said aircraft comprises a control device of the vortex of a leading edge extension of the wing leading edge root extension, in which the ratio between the surface of one leading edge extension and a height of a corresponding control device is 2.35 m with a variable tolerance in a range from 100% and −50% of the ratio, comprising between 1.175 m and 4.70 m, said control device of the vortex generated by the edge, cooperates with a tail, obtained by coupling of a vertical tail with the wings whose leading edges penetrate trailing edges of each wing;

an equipment comprising at least one dissipating device of incident radar waves which is removably applied on at least one hot portion of the aircraft;

the at least one hot portion of the aircraft comprising:

a piloting cabin or cockpit having at least one transparent portion;

a fuselage frame;

a plurality of leading edges of components, the components comprising wings, tail veils and air intakes of the at least one engine;

at least one engine face;

wherein to reduce radar marking from the at least one engine face, the equipment comprises at least one grid having an inner structure with a plurality of apertures, and a support structure having a plurality of rings securing said grid to the aircraft;

each of the apertures comprises an internal surface coated with radar absorbing material adapted to absorb electromagnetic waves at high frequency;

said grid is adapted to permit entry of air flow towards the at least one engine and reduce radar visibility of the at least one engine face of the aircraft.

2. The aircraft according to claim 1, wherein said nose, with a low extension, has a profile with a variable geometry starting from a tip up to a connecting corner of said nose with an apex of said leading edge root extension, said profile having, starting from said tip, a substantially circular section and a section with an oval and domed geometric shape.

3. The aircraft according to claim 1, wherein said decoupling of the horizontal and vertical tail is obtained by a vertical stabilizer with a trapezium shape and coupled with the wing wherein the leading edges penetrate the trailing edges of each wing.

4. The aircraft according to claim 3, wherein said decoupling of the tail is obtained by a horizontal empennage having a trapeze shape, with symmetric and asymmetric deflection, said horizontal stabilizer having a trapezium shape, with the symmetric and asymmetric deflection, said horizontal stabilizer having a hinge axis, which is inclined with respect to a transversal axis of the aircraft.

5. The aircraft according to claim 1, wherein said air intake does not have a spacer of limit layer or diverter on the upper side of the intake.

6. The aircraft according to claim 1, wherein said air intake has a medium radius at the leading edge of an inner lip equal to 7 mm, wherein a medium radius of a lower lip is equal to 17.5 mm and a medium radius of an outer radius is equal to 14 mm, the capture area of said air intake is equal approximately to $0.322 \text{ m}^2$, the throat area of the air intake is approximately equal to $0.257 \text{ m}^2$ and the air inlet to the engine is approximately equal to $0.273 \text{ m}^2$.

7. The aircraft according to claim 1, wherein each wing of the aircraft is shaped as a trapezium and has at least a sawtooth area in at least one portion of the wingspan, said wing also providing an leading edge with a radius with a triangular profile.

8. The aircraft according to claim 1, wherein each wing of the aircraft is provided with a profile with variable bending, both at the leading edge and of the trailing edge, near at least one flap, for producing a reduction of the bending which alleviates effects of compressibility.

* * * * *